M. L. SEVERY.
POWER TRANSMISSION MECHANISM.
APPLICATION FILED DEC. 18, 1912.

1,173,877.

Patented Feb. 29, 1916.
2 SHEETS—SHEET 1.

WITNESSES:
L. J. Carr
John Gordon

INVENTOR:
Melvin L. Severy
By his Attorney
William J. Sperl

UNITED STATES PATENT OFFICE.

MELVIN L. SEVERY, OF ARLINGTON HEIGHTS, MASSACHUSETTS, ASSIGNOR TO SEVERY MANUFACTURING COMPANY, OF BOSTON, MASSACHUSETTS, A CORPORATION OF MASSACHUSETTS.

POWER-TRANSMISSION MECHANISM.

1,173,877. Specification of Letters Patent. Patented Feb. 29, 1916.

Application filed December 18, 1912. Serial No. 737,393.

*To all whom it may concern:*

Be it known that I, MELVIN L. SEVERY, of Arlington Heights, in the county of Middlesex and State of Massachusetts, have invented certain new and useful Improvements in Power-Transmission Mechanism, of which the following is a specification.

This invention relates to power transmission mechanism.

The object of the invention is to provide improved means for transmitting power, comprising a driving mechanism, a driven mechanism, and an interposed medium for transmitting the power from the former to the latter, the relations of said mechanisms with respect to one another and to said medium being varied to regulate the amount of power transmitted.

The interposed medium may be a fluid, a more or less finely divided solid, or a mixture of the two. In the present embodiment of the invention I preferably employ a solid in divided spherical form, such as balls of steel or the like, and a lubricating fluid such as oil or glycerin, the fluid being for the purpose of cushioning the shock of the balls upon each other, upon the driven vanes or paddles, and upon the confining walls, for reducing their noise, and for lubrication and diminution of wear. In the illustrated embodiment of the invention the driving member comprises a rotary drum having interior longitudinal ribs to prevent slippage of the balls, and a driven member which comprises a drum having a pair of paddles which are adjustable simultaneously to vary the extent of their engagement with the rotating stream of the transmitting medium.

Figure 1:
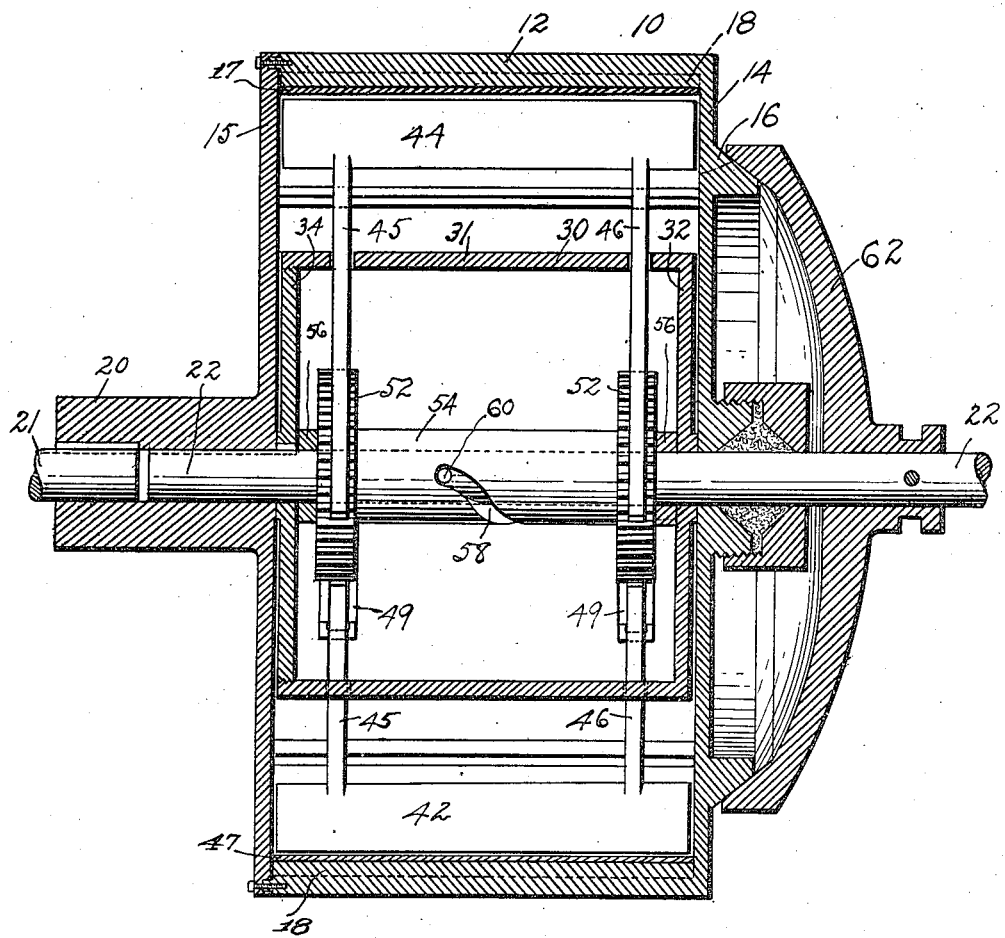
Figure 2:
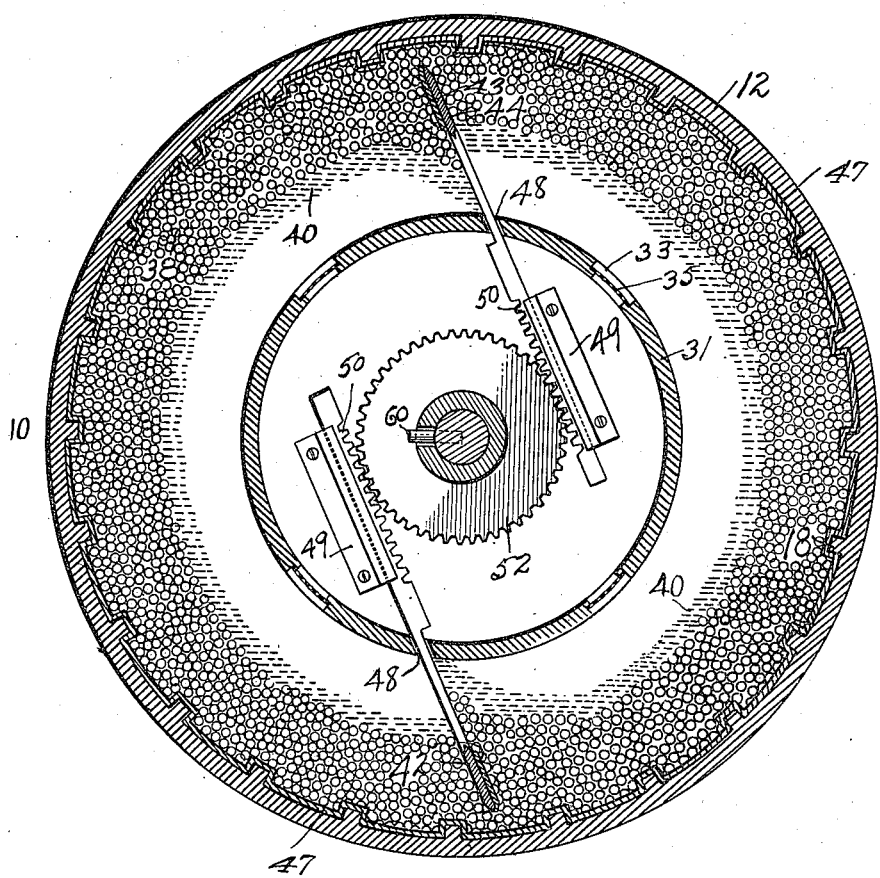

In the accompanying drawings Figure 1 is a central, longitudinal, vertical section of an illustrative embodiment of my invention, and Fig. 2 is a transverse vertical section of the same in motion.

As illustrated in said drawings, the driving member comprises a drum 10, having a cylindrical wall 12 and interiorly flat end walls 14 and 15. The end wall 14 is preferably cast integral with the cylindrical wall 12, and is provided on its exterior with a conical ring 16 of a friction clutch, and the end wall 15 is preferably bolted to said cylindrical wall. The internal periphery of the shell 12 is provided with longitudinally extending ribs 18, which prevent slippage of the transmitting medium, to be hereinafter described. The end wall 15 is provided with an outwardly projecting boss 20 into which a driving shaft 21 is stationarily keyed, and a driven shaft 22 is slidably and rotatably fitted.

The driven member comprises a drum 30 having a cylindrical wall 31 and interiorly flat end walls 32 and 34. The end wall 32 is preferably cast integrally with the cylindrical wall 31, and the end wall 34 is preferably screwed into said cylindrical wall. The end wall 34 is keyed to the driven shaft 22 so as to enable said shaft to slide through it and yet be rotated by the driven drum 30. The wall 31 is provided with a series of openings 33 which are covered by screens 35 to admit lubricant into the drum 30 but to prevent solid particles from entering.

The transmitting medium is preferably composed of a mixture of small steel balls 38 and a lubricant 40, such as oil or glycerin, only a portion of which is shown. The lubricant may be any suitable fluid. When the driving drum is rotated the steel balls are thrown outwardly by centrifugal force against the inner periphery of said drum, and are prevented from slipping along said periphery by the ribs 18. The balls 38 will thus form an outer annulus having its interstices filled with the lubricant 40, and said lubricant will form an inner annulus between said balls and the outer periphery of the shell 31. The amount of fluid should be such as to immerse the balls and fill the interstices between them.

In order to bring the driven member into driving relation with the transmitting medium, I provide said member with a plurality of oppositely disposed adjustable medium-engaging members. As here shown they comprise a pair of paddles 42, 44 each having a pair of laterally extending arms 45, 46, which pass through slots 48 formed in the cylindrical wall 31, and slide in guide blocks 49 secured to the end walls 32 and 34. The paddles are sharpened on their outer and inner edges to facilitate their cutting through the mass of balls. Although only two paddles are shown, it will be understood that any number may be employed. The action of the paddles upon the balls 38 is similar to that of a lathe tool turning off an internal chip, and the balls escape from the under side of the paddles in a course which is approximately tangential to the said under side of said paddles.

The arms 45, 46 are provided near their inner ends with gear racks 50, which mesh with gears 52 on or integral with a sleeve 54 slidable on the shaft 22, said gears being thus connected to rotate together. A pair of collars 56 are provided on the shaft 22 between the gears 52 and the inner opposing faces of the end walls 32 and 34, to prevent endwise motion of said gears and the sleeve 54.

In order to rotate the gears 52, the sleeve 54 is provided with a spiral slot 58 which receives a pin 60 projecting from the shaft 22 preferably on both sides thereof. When the shaft 22 is moved longitudinally the sleeve 54 is given a partial rotation and with it the gears 52 are partially rotated. The rotation of said gears causes the movement of the arms 45, 46 and with them the paddles 42 and 44 to vary the extent of engagement of said paddles with the transmitting medium.

Pinned to the shaft 22 is an outer clutch-member 62 which is adapted to engage the clutch-member 16 when the paddles are engaged with the transmitting medium to the fullest extent. When the device in not being rotated the balls 38 all settle to the bottom of the outer drum, but are prevented from entering the drum 30 by the screens 35.

When it is necessary to have quiet, the paddles may be shod in rawhide 43 on their striking faces, and the whole device inclosed in a sound damping casing. The oil, however, when a high rate of speed prevents the balls from falling by gravity, serves to stop most of the noise. Where desired other surfaces, such as the ribbed interior of the drum may likewise be cushioned with rawhide 47, although this will ordinarily not be necessary. The device may be run either in a vertical or a horizontal plane.

It is particularly to be noted that under the embodiment of my invention here illustrated, the driving member is the outer drum 10, keyed or otherwise made fast to the power or motor shaft 21, while the driven member is the inner drum 30 and its shaft 22. With the means of coupling or connecting the inner and outer drums here shown and described, the inner drum can never make more than the same number of revolutions per minute than the outer or driving drum makes, and will usually if not invariably, make fewer turns because of the slip or movement of the balls or other loose bodies upon and among themselves. The outer drum being materially larger than the inner one, will of course rotate with greater velocity or peripheral speed, and the the connecting media will be thrown outward by centrifugal force, and pressed against the inner surface of the driving drum to a degree proportionate to the speed of rotation. It hence follows that if the driving shaft 21 rotate at a proper speed, the connecting media will, as above mentioned, arrange themselves in an annular body around the interior surface of the drum in position to act upon the paddles or blades 44, if these be projected sufficiently to enter or engage such moving annular mass. If, on the other hand, the inner drum were the driving member, it is obvious that the driving media would tend naturally to occupy the lower side of the outer drum, and would not take on the annular form unless or until, and after a considerable time, the outer drum should attain, through the relatively inefficient connection which such arrangement would establish, a speed, and the media acquire a centrifugal force, sufficient to cause the annular arrangement of such driving media.

The distinction is an important one, because so long as the power shaft has its proper speed of rotation, there is always present a relatively compact body of the small solid particles (balls or the like), and liquid, into which the blades or paddles may be projected to whatever depth is necessary to insure the desired degree of engagement or driving effect. If the blades or paddles enter but slightly into the relatively compact mass of balls or loose bodies, there will be a considerable difference in the number of turns made by the driving and driven members, because only the relatively light annular body or layer of balls from the outer edge of the blades or paddles inward, will bear against or be engaged by said paddles, and the momentum of only that relatively thin layer will be applied as driving force to the blades or paddles. Whenever, therefore, the resistance of the driven member increases to a point exceeding the momentum of such layer and the friction between such layer and the outer mass, the blades will scrape off and drop inward the balls or particles with which they come in contact, the balls or bodies so removed dropping to and being picked up by a lower portion of the driving drum, and re-arranging themselves as before. There will hence be a considerable slip or difference in angular movement between the driving and driven members.

If the blades be forced more deeply into the connecting media, a greater body thereof will bear against the blades, and by its greater momentum carry them and the drum in which they are mounted, forward with reduced slip, until a point is reached where the balls are practically unable to pass between the blades or paddles and the outer drum, when the inner and outer drums will turn as one, or practically so. Under all except an extreme outward adjustment of the blades or paddles, there will be space sufficient for at least one layer of the balls or loose bodies to pass between the outer edges of the blades or paddles and the inner edges of the ribs of the driving drum, and hence a slip or lost motion will be possible under all save such extreme adjustment.

It will be noted that there is no contraction of the space in which the balls or other free bodies are held, and that the varying driving connection and varying slip are directly controlled by and proportionate to the depth to which the blades or paddles penetrate the annular mass of loose balls or bodies. It is hence possible at any moment to change the driving connection and the speed relation to any extent desired, and without delay.

What I claim is:—

1. A power transmission mechanism comprising an outer rotary driving member; an inner rotary driven member; a transmitting medium composed of free, finely divided solid material between the inner and outer members, and serving when the outer member is rotated to arrange itself in an annular layer or body upon or against the inner surface of the driving member; and means carried by the driven member for engaging said transmitting medium.

2. A power transmission mechanism comprising an outer rotary driving member; a transmitting medium composed of small solid spheres placed within said driving member; and an inner driven member concentric with the driving member, and provided with means for engaging the transmitting medium as the latter is carried forward by the driving member.

3. A power transmission mechanism comprising an outer rotary driving member; an inner rotary driven member; a transmitting medium contained in the space between the inner and outer members, and composed of small solid spheres mixed with a lubricant; and means carried by the driven member for engaging the transmitting medium as the same is carried forward by the driving member.

4. A power transmission mechanism comprising an outer rotary driving member having its inner surface ribbed or corrugated in the general direction of its axis; an inner driven member; a transmitting medium composed of a multiplicity of small solids contained in the space between the driving and driven members; and means carried by the driven member for engaging said transmitting medium to impart motion to said driven member.

5. A power transmission mechanism comprising an outer rotary driving member having a ribbed inner surface; an inner driven member; a transmitting medium composed of small solid spheres and a lubricant, contained in the space between the driving and driven members; and oppositely-disposed blades or paddles carried by the driven member for engaging the transmitting medium and effecting a driving connection or relation between the same and the driving member.

6. A power transmission mechanism comprising an outer rotary driving member having a ribbed inner surface; an inner driven member; a transmitting medium composed of small solid spheres and a lubricant, contained in the space between the driving and driven members; and adjustable oppositely-disposed blades or paddles carried by the driven member, for engaging the transmitting medium and effecting a variable driving connection or relation between the same and the driving member.

7. A power transmission mechanism, comprising a rotary driving member, a transmitting medium composed of small steel balls and a liquid arranged to be rotated by said member, a driven member having a pair of oppositely disposed movably mounted paddles adapted to engage said medium, and means for regulating the movements of said paddles to vary the amount of power transmitted.

8. A power transmission mechanism, comprising a rotary driving member, a transmitting medium composed of small steel balls and a liquid arranged to be rotated by said member, a driven member having a pair of oppositely disposed movably mounted paddles adapted to engage said medium, means for regulating the movements of said paddles to vary the amount of power transmitted, and means for clutching said members together when said paddles are in fullest engagement with said balls.

9. A power transmission mechanism, comprising a rotary driving member, a transmitting medium composed of a finely divided solid and a liquid arranged to be rotated by said member so that the solid particles assume the form of an outer annulus and the liquid fills the interstices between the particles and forms an inner annulus, and a rotary driven member having means for engaging said medium to rotate said driven member.

10. A power transmission mechanism, comprising a rotary driving member, a rotary driven member, a transmitting medium interposed between said members, a pair of paddles on said driven member adapted to engage said medium, a longitudinally movable shaft, and means comprising gears coöperating with said shaft and paddles whereby the movements of the latter are controlled.

11. A power transmission mechanism comprising two concentric drums, one within the other and constituting driving and driven members, the outer drum being furnished with inwardly-projecting ribs, and the inner drum provided with outwardly-projecting blades or paddles; and a transmitting medium contained within the space between the inner and outer drums, comprising a mass of small spheres or bodies freely movable among themselves and in the space between said members, the bodies being of such diameter as to permit them under normal adjustment of the parts, to pass through the spaces between the inwardly-projecting ribs of the outer member and the blades or paddles of the inner member.

12. A power transmission mechanism comprising two concentric drums, one within the other and constituting driving and driven members, the outer drum being furnished with inwardly-projecting ribs, and the inner drum provided with outwardly-projecting blades or paddles; and a transmitting medium contained within the space between the inner and outer drums, comprising a lubricant and a mass of small spheres or bodies freely movable among themselves and in the space between the said members, the bodies being of such diameter as to permit them under normal adjustment of the parts, to pass through the spaces between the inwardly-projecting ribs of the outer member and the blades or paddles of the inner member.

13. A power transmission mechanism comprising an outer drum; an inner drum concentric with the outer drum; a transmitting medium formed of small, freely movable particles contained within the space between the outer and inner drums, and adapted when the outer drum attains a predetermined speed to arrange itself in the form of an annular layer or body against the inner surface of said drum; and a blade or paddle carried by the inner drum and projecting into said transmitting medium, and serving thereby to establish a driving connection between the outer and inner drums.

14. A power transmission mechanism comprising an outer drum; an inner drum concentric with the outer drum; a transmitting medium formed of small, freely movable particles contained within the space between the outer and inner drums, and adapted when the outer drum attains a predetermined speed to arrange itself in the form of an annular layer or body against the inner surface of said drum; a blade or paddle carried by the inner drum and adapted to be projected to greater or less extent into said transmitting medium, and thereby to establish a driving connection between the outer and inner drums; and means, substantially as described, for adjusting the blade to project its outer edge more or less deeply into the annular layer of movable particles.

In testimony whereof I have affixed my signature in presence of two witnesses.

MELVIN L. SEVERY.

Witnesses:
EDWARD S. CROCKETT,
WILLIAM J. SPERL.